P. A. KALBAUGH.
CART.
APPLICATION FILED OCT. 26, 1909.
1,005,979.
Patented Oct. 17, 1911.
2 SHEETS—SHEET 1.
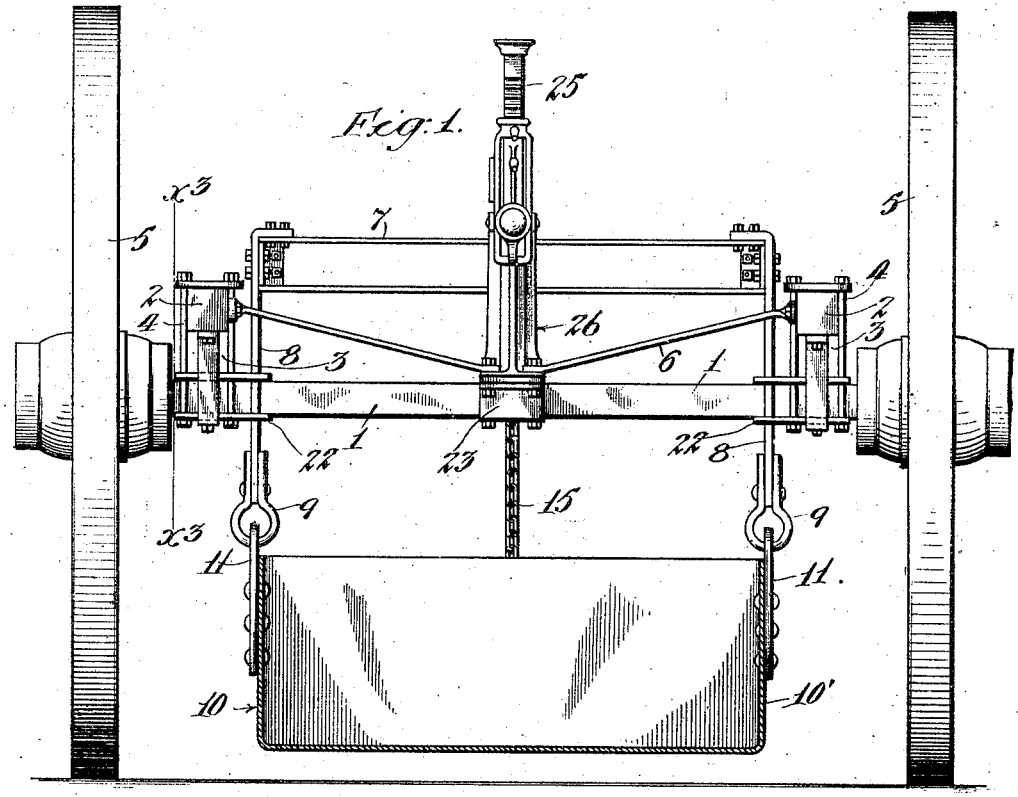
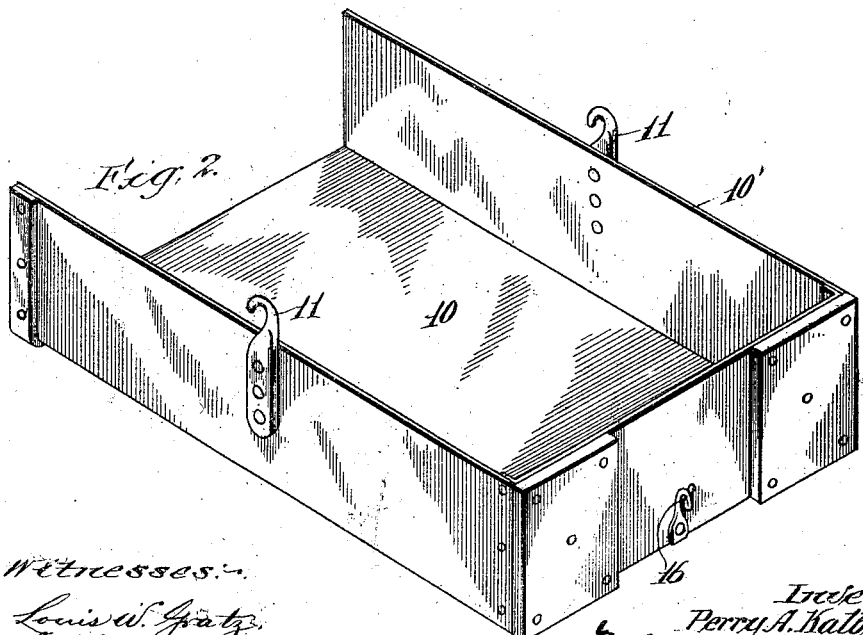

P. A. KALBAUGH.
CART.
APPLICATION FILED OCT. 26, 1909.
1,005,979.
Patented Oct. 17, 1911.
2 SHEETS—SHEET 2.
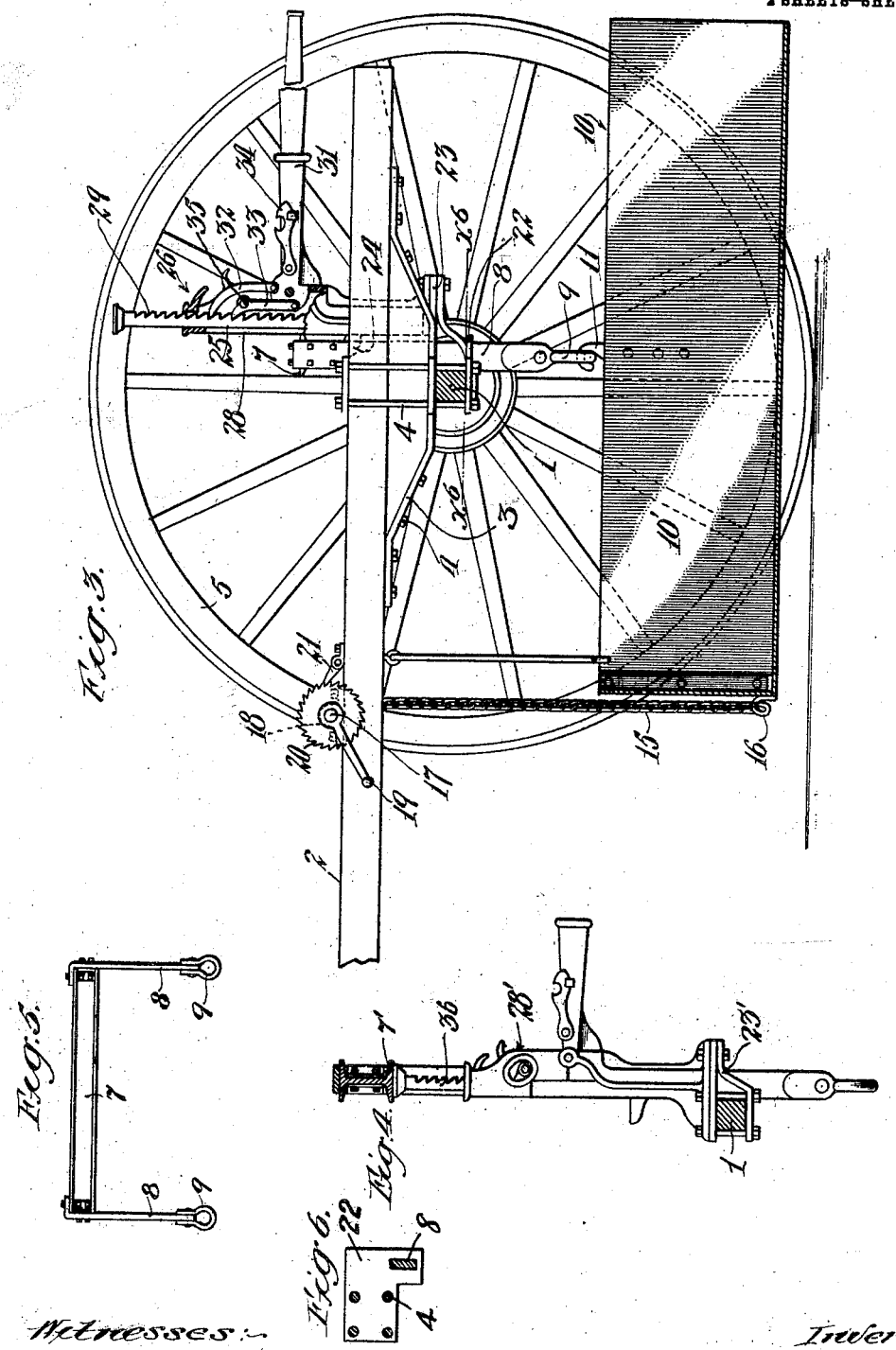

UNITED STATES PATENT OFFICE.

PERRY A. KALBAUGH, OF SAN DIEGO, CALIFORNIA.

CART.

1,005,979.      Specification of Letters Patent.     Patented Oct. 17, 1911.

Application filed October 26, 1909. Serial No. 524,710.

*To all whom it may concern:*

Be it known that I, PERRY A. KALBAUGH, a citizen of the United States, residing at San Diego, in the county of San Diego and State of California, have invented a new and useful Cart, of which the following is a specification.

This invention relates to a cart for conveying rock, earth or other material, and the main object of the invention is to provide means for this purpose whereby the conveyance of the material can be expedited and the cost of transportation minimized.

A further object of the invention is to provide conveying means for the stated purpose which will enable a single truck to operate several conveying receptacles and will provide for filling of some of the receptacles while others are being moved or transported.

Another object of the invention is to provide an apparatus of this character in which the receptacles are hung in such manner from the transporting means as to prevent liability of injury to the wheels and other parts of said transporting means.

Another object of the invention is to provide rock conveying means especially adapted for use in quarries and providing receptacles that can remain in position to receive the rock without liability of damage by the blasts.

Other objects of the invention will appear hereinafter.

Referring to the drawings:—Figure 1 is a rear elevation of the cart. Fig. 2 is a perspective of the skip or receptacle. Fig. 3 is a vertical section on the line $x^3$—$x^3$ in Fig. 1. Fig. 4 is a side elevation of a modified form of the lifting jack for the receptacle, the supporting parts of the truck frame being shown in section. Fig. 5 is a rear elevation of the supporting frame for the rock receptacle. Fig. 6 is a horizontal section on line $x^6$—$x^6$ in Fig. 3.

The invention comprises a truck or wheeled carrier and a skip or receptacle detachably supported thereon, several of the skips being preferably provided for each truck.

The truck comprises a frame consisting of an axle 1, and shafts 2 extending above the axle 1 and supported thereon by truss bars 3 and bolts 4 and wheels 5 journaled on the ends of the axle 1. Truss or brace bars 6 are provided to brace the shafts 2 from the axle 1 with respect to stresses lateral to the truck. A frame consisting of a top bar 7 and vertical bars 8 is mounted to move vertically on the truck frame, said bars 8 extending below the axle to form brackets or hangers and being provided with eyes 9 at their lower ends to receive and support hooks on the skip or receptacle 10. Said skip or receptacle consists of a rectangular box open at top and the rear and formed preferably of sheet metal, the side plates 10′ of the receptacle being provided with hooks 11 fastened to the sides 10′ of the receptacle. The hooks 11 pivot on the eyes 9 in such a way that when the skip is filled the center of gravity will be slightly forward of the points of suspension by the hooks and the forward end of the skip is supported by suspension means from the truck frame, said means consisting of a chain 15 detachably secured to a hook 16 at the front end of the receptacle 10, the upper end of said chain being secured to a winding shaft 17 journaled in bearings 18 on the shafts 2 and provided with an operating handle 19 and with a ratchet wheel 20 engaged by a pawl 21 to retain the chain in raised position when wound on the shaft 17.

In order to raise the members 8 so as to lift the receptacle 10 clear of the ground for transportation, said members 8 are mounted to slide in vertical guide ways 22 on the frame and the cross bar 7 connecting the bars 8 extends over a lug or projection 24 on the vertically sliding member 25 of a lifting jack 26 supported by bracket 23 on axle 1. Said lifting jack may be of any usual or suitable construction comprising, for example, a standard 28 within which the member 25 slides vertically, said member 25 being provided with ratchet teeth 29 and an operating lever 31 being provided pivoted on the standard 28 and having pawl means 32, 33 engaging the ratchet teeth 28 to lift the member 25 of the jack step by step on vertical reciprocation of the lever. A release member 34 is pivoted on the operating lever 31 of the jack for engaging a projection 35 on lifting pawl 33 to disengage said pawl from the rack and allow the receptacle 10 to drop.

In the form of the invention shown in Fig. 4, the jack indicated at 28′ is supported directly on top of the axle 1 by bracket bars 23′ and the top bar 7′ rests directly on the vertically moving member 36 of the jack, the construction being otherwise as above described.

The operation is as follows: The skips or receptacles 10 are deposited on the ground or floor of the quarry directly adjacent to the workings with their open rear ends toward the face of the workings, so that the material blasted from the rock face can be directly shoveled into the receptacle. A plurality of such receptacles are preferably provided, so that sufficient receptacles are always available for performing the operation, while others are being transported or conveyed away from the quarry. When a receptacle has become charged the cart is backed over the same and the eyes 9 at the lower end of the frame bars 8 are engaged with the hooks 11 on the receptacle 10, the jack 26 being then operated to lift the receptacle from the ground by means of the frame 7, 8, and the winding shaft 17 being also operated by handle 19 to lift the front end of the receptacle 10 clear of the ground, the cart may then be drawn to any desired point for delivering and the contents of the receptacle 10 are then dumped by raising the front end of the receptacle by rotation of the winding shaft 17 to wind the chain 15 on said shaft, the shaft being preferably so arranged that the rear end of the receptacle can during this operation tip down as far as it is required for ejection of the material by gravity. When the receptacle 10 has thus been emptied, the pawl 21 is released from the ratchet wheel 20 of the windlass shaft 17, and the receptacle is allowed to drop back to substantially horizontal position. It is then transported by the truck to the vicinity of the workings, and the truck is backed up toward the face of the workings, and the release member 34 is drawn over toward the rack on the vertically movable member 25, and the operating handle 31 is then pulled down, this operation withdrawing pawl 32 from the rack 29 and operating at the same time to withdraw pawl 33 from said ratchet rack. The member 25 being then unsupported, the vertical sliding frame 7, 8, which rests on said member 25, also drops, allowing the receptacle 10 to descend and the pawl 21 being disengaged at the same time the receptacle is deposited on the ground or floor of the quarry in direct proximity to the rock, with the open end of the receptacle facing the workings so that the rock can be shoveled thereinto. The descent of the sliding frame 7, 8 is preferably sufficient to disengage the eyes 9 from the hooks 11 so that the truck may then be moved away for transportation of other receptacles while the dropped receptacle is being filled. The support of the receptacle by means of the frame 8 sliding in vertical guide ways on the truck frame prevents lateral displacement of the receptacle and protects it from striking the wheels of the truck, thereby protecting the truck wheels from injury. As shown in Fig. 5, the frame 7, 8 is a rigid frame, and it is guided in its vertical movement so as to prevent lateral motion of the receptacle 10.

An important advantage of the invention is that the rock or earth does not require to be raised to any considerable extent to place it in the receptacle, as it can be shoveled or pushed directly into the open end of the receptacle, from the pile of rock or earth, without lifting. Great economy of operation is thereby attained.

What I claim is:—

A cart comprising a wheeled truck provided with vertically extending guide means, a rigid frame provided with means engaging in said guide means to guide said frame vertically on said truck, jack means for raising and lowering said frame, a receptacle open at the top and at the rear, means for detachably supporting said receptacle on said vertically moving frame, means for supporting the forward end of said receptacle comprising a windlass and a chain connected to said windlass and having a releasable connection with the receptacle.

In testimony whereof, I have hereunto set my hand at Los Angeles, California, this 18th day of October, 1909.

PERRY A. KALBAUGH.

In presence of—
ARTHUR P. KNIGHT,
FRANK L. A. GRAHAM.